(12) United States Patent
Cui et al.

(10) Patent No.: US 11,016,249 B2
(45) Date of Patent: May 25, 2021

(54) FIBER OPTICAL CONNECTOR

(71) Applicant: ACON OPTICS COMMUNICATIONS INC., New Taipei (TW)

(72) Inventors: Yang-Yang Cui, New Taipei (TW); Yan-Mei Chang, New Taipei (TW)

(73) Assignee: ACON OPTICS COMMUNICATIONS INC., New Taipei (TW)

( * ) Notice: Subject to any disclaimer, the term of this patent is extended or adjusted under 35 U.S.C. 154(b) by 0 days.

(21) Appl. No.: 16/845,344

(22) Filed: Apr. 10, 2020

(65) Prior Publication Data

US 2020/0333538 A1    Oct. 22, 2020

(30) Foreign Application Priority Data

Apr. 11, 2019   (CN) .......................... 201920485629.8

(51) Int. Cl.
    *G02B 6/38*    (2006.01)
(52) U.S. Cl.
    CPC ......... *G02B 6/3893* (2013.01); *G02B 6/3849* (2013.01); *G02B 6/3874* (2013.01); *G02B 6/3877* (2013.01); *G02B 6/3897* (2013.01)
(58) Field of Classification Search
    CPC .. G02B 6/3807; G02B 6/3897; G02B 6/4292; G02B 6/4277; G02B 6/4215; G02B 6/4246; G02B 6/426; G02B 6/4269; H04B 10/5051; H04B 10/40; H04B 10/5161; H04B 10/548; G02F 1/015; G02F 1/0356; G02F 2001/0157; G02F 2001/212; H01L 31/0203

USPC ............................... 385/3, 53, 56, 78, 88–92
See application file for complete search history.

(56) References Cited

U.S. PATENT DOCUMENTS

| | | | |
|---|---|---|---|
| D434,376 S | 11/2000 | Connelly | |
| 6,402,393 B1* | 6/2002 | Grimes | G02B 6/3897 385/56 |
| 6,565,262 B2 | 5/2003 | Childers et al. | |
| 7,118,284 B2* | 10/2006 | Nakajima | G02B 6/3807 385/53 |
| 7,658,551 B1 | 2/2010 | Wu et al. | |
| D619,100 S | 7/2010 | Larson et al. | |
| 8,221,007 B2 | 7/2012 | Peterhans et al. | |
| D705,168 S | 5/2014 | Yamauchi et al. | |
| D705,169 S | 5/2014 | Yamauchi et al. | |
| D783,618 S | 4/2017 | Wu et al. | |
| 9,618,703 B2 | 4/2017 | Iizumi et al. | |
| 9,967,983 B2 | 5/2018 | Coffey et al. | |

(Continued)

*Primary Examiner* — Michael P Mooney

(74) *Attorney, Agent, or Firm* — Innovation Capital Law Group, LLP; Vic Lin

(57) ABSTRACT

A fiber optical connector includes a connector housing and an optical-fiber component. The connector housing includes a receiving space. Two ends of the connector housing respectively form a first connector opening and a second connector opening. The first connector opening and the second connector opening communicate with the receiving space. Plural pins are assembled on a side surface of the connector housing, and the optical fiber component is inserted into the receiving space from the first connector opening. The connector housing has an improved structural strength. The assembling between the pins and the circuit board allows the connector to be fixedly positioned with the circuit board.

17 Claims, 4 Drawing Sheets

(56) References Cited

U.S. PATENT DOCUMENTS

| | | |
|---|---|---|
| D830,304 S | 10/2018 | Choi |
| 10,520,687 B2 | 12/2019 | Lee |
| 2004/0202431 A1 | 10/2004 | Bates |
| 2009/0269014 A1 | 10/2009 | Winberg et al. |
| 2010/0272397 A1 | 10/2010 | Komaki et al. |
| 2011/0097044 A1 | 4/2011 | Saito et al. |
| 2011/0243506 A1 | 10/2011 | Hsu |
| 2012/0027360 A1 | 2/2012 | Larson et al. |
| 2012/0146660 A1 | 6/2012 | Mattson |
| 2013/0051734 A1 | 2/2013 | Shen et al. |
| 2015/0253517 A1 | 9/2015 | Taira et al. |
| 2015/0331202 A1 | 11/2015 | Rosson |
| 2016/0231512 A1 | 8/2016 | Seki |
| 2017/0235063 A1 | 8/2017 | Ahmed et al. |
| 2017/0299818 A1 | 10/2017 | Chang et al. |
| 2018/0217339 A1 | 8/2018 | Ma et al. |

\* cited by examiner

FIBER OPTICAL CONNECTOR

CROSS-REFERENCE TO RELATED APPLICATION

This non-provisional application claims priority under 35 U.S.C. § 119(a) to Patent Application No. 201920485629.8 filed in China, P.R.C. on Apr. 11, 2019, the entire contents of which are hereby incorporated by reference.

FIELD OF THE INVENTION

The instant disclosure relates to a connector, and more particular to a fiber optical connector.

BACKGROUND

The optical fiber is an tool for optical transmission. In general, a fiber optical connection device includes a female adapter with two ends being inserted by male fiber optical connectors, so that the adapter and the connectors can be fixed with each other, and data transmission can be performed between electronic devices connected through the fiber optical connection device.

A variety of fiber optical connectors are available. One of the fiber optical connectors is the MPO (multi-fibre push on) connector, which is a multi-core and multi-channel connector, and is applicable to circumstances where plural optical fibers are densely arranged within a limited space. In an MPO fiber optical connector known to the inventor, the assembling of the housing is achieved by welding, and the connection between the housing and the printed circuit board (PCB) is achieved by the fixation of metallic pieces.

SUMMARY OF THE INVENTION

In the MPO fiber optical connector known to the inventor, the housing is manufactured by welding two shells with each other. As a result, the structural strength at the welded portion of the housing is insufficient and burrs may be formed on the housing easily. Moreover, in such MPO fiber optical connector, the housing and the PCB are not fixedly positioned with each other, and the PCB may swing relative to the housing easily to cause insufficient precision of the alignment angle of the insertion cores within the housing, resulting a great signal loss for the connector.

In view of these, an embodiment of the instant disclosure provides a fiber optical connector comprising a connector housing and an optical-fiber component. The connector housing comprises a receiving space. Two ends of the connector housing respectively form a first connector opening and a second connector opening. The first connector opening and the second connector opening communicate with the receiving space. A plurality of pins is assembled on a side surface of the connector housing, and the optical fiber component is inserted into the receiving space from the first connector opening.

In one or some embodiments, a plurality of positioning blocks is protruding from the side surface of the connector housing, and the positioning blocks are at two sides of the pins.

In one or some embodiments, the optical-fiber component comprises a fixation socket member, a connection sleeve, an insertion core, and a sleeve piece. The fixation socket member is assembled in the receiving space. The connection sleeve is buckled with one end of the fixation socket member. The insertion core is in the connection sleeve. The sleeve piece holds one end of the insertion core and is fixed in the fixation socket member.

In one or some embodiments, an inner side of the fixation socket member comprises a plurality of engaging grooves. A plurality of annular protruding portions is protruding from an outer peripheral surface of one of two ends of the connection sleeve, and the annular protruding portions are engaged with the engaging grooves, respectively.

In one or some embodiments, an inner surface of the connector housing comprises a plurality of protruding blocks and a plurality of baffling blocks. The protruding blocks and the baffling blocks are adjacent to the first connector opening.

The fixation socket member comprises a stopping member. The stopping member comprises a plurality of buckling grooves for buckling with the protruding blocks, and the baffling blocks are abutted against an inner wall of the stopping member.

In one or some embodiments, the other end of the connection sleeve is exposed out of the fixation socket member. A stopping flange is protruding from an outer peripheral surface of the other end of the connection sleeve, and the stopping flange is abutted against an outer surface of the stopping member.

In one or some embodiments, an outer diameter of each of the annular protruding portions is less than an outer diameter of the stopping flange.

In one or some embodiments, two side arms extend from two sides of a side wall of the stopping member, and the side arms outwardly extend into the receiving space.

In one or some embodiments, the fiber optical connector further comprises a dustproof cap covering the second connector opening. A casing extends from a side surface of the dustproof cap, and the side arms are respectively engaged with two sides of the casing.

In one or some embodiments, each of the pins comprises an outer annular portion fixed with the connector housing.

According to one or some embodiments of the instant disclosure, following advantages can be provided.

The one-piece connector housing has improved structural strength and aesthetic appearance, and the connector housing can be manufactured with increased production efficiency and reduced costs.

The assembling between the connector housing and the optical-fiber component is achieved by mechanical engaging structures. Hence, the product can be manufactured automatically, and the performances of the product during the manufacturing process can be monitored by different signals.

The connector housing is assembled with plural pins. The pins have high structural strengths. In one embodiment, the pins are made of zinc alloy, and the assembling between the pins and the circuit board allows the connector to be fixedly positioned with the circuit board, thereby ensuring the insertion core to have a more precise alignment angle. Hence, the fiber optical connector can be coupled with the electronic devices in a simple and convenient manner, and the fiber optical connector can provide a stable signal transmission.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

Figure 1:
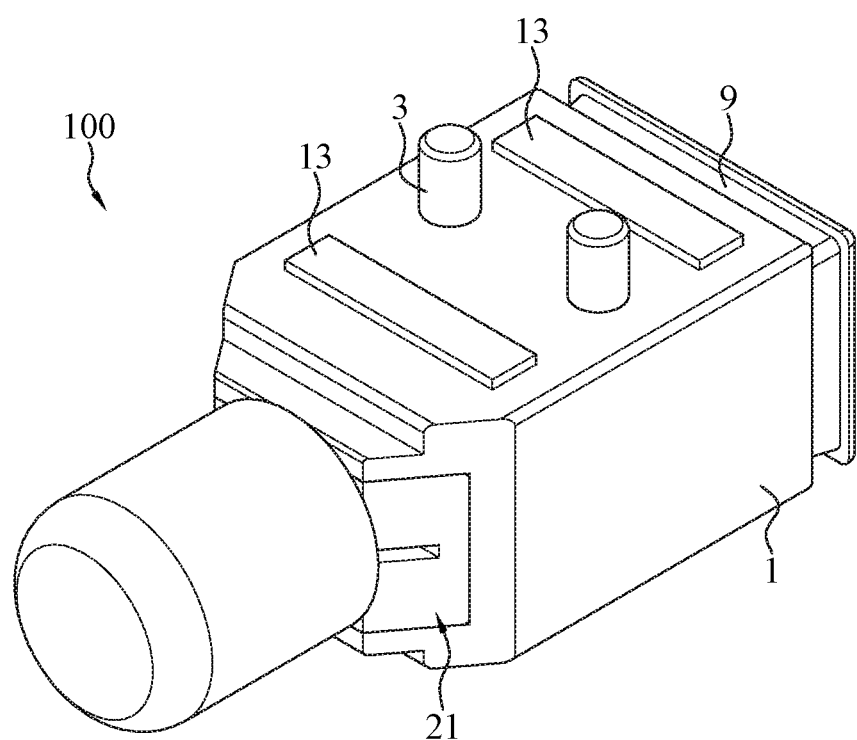
FIG. 1 illustrates an exploded view of a fiber optical connector according to an exemplary embodiment of the instant disclosure.
Figure 2:
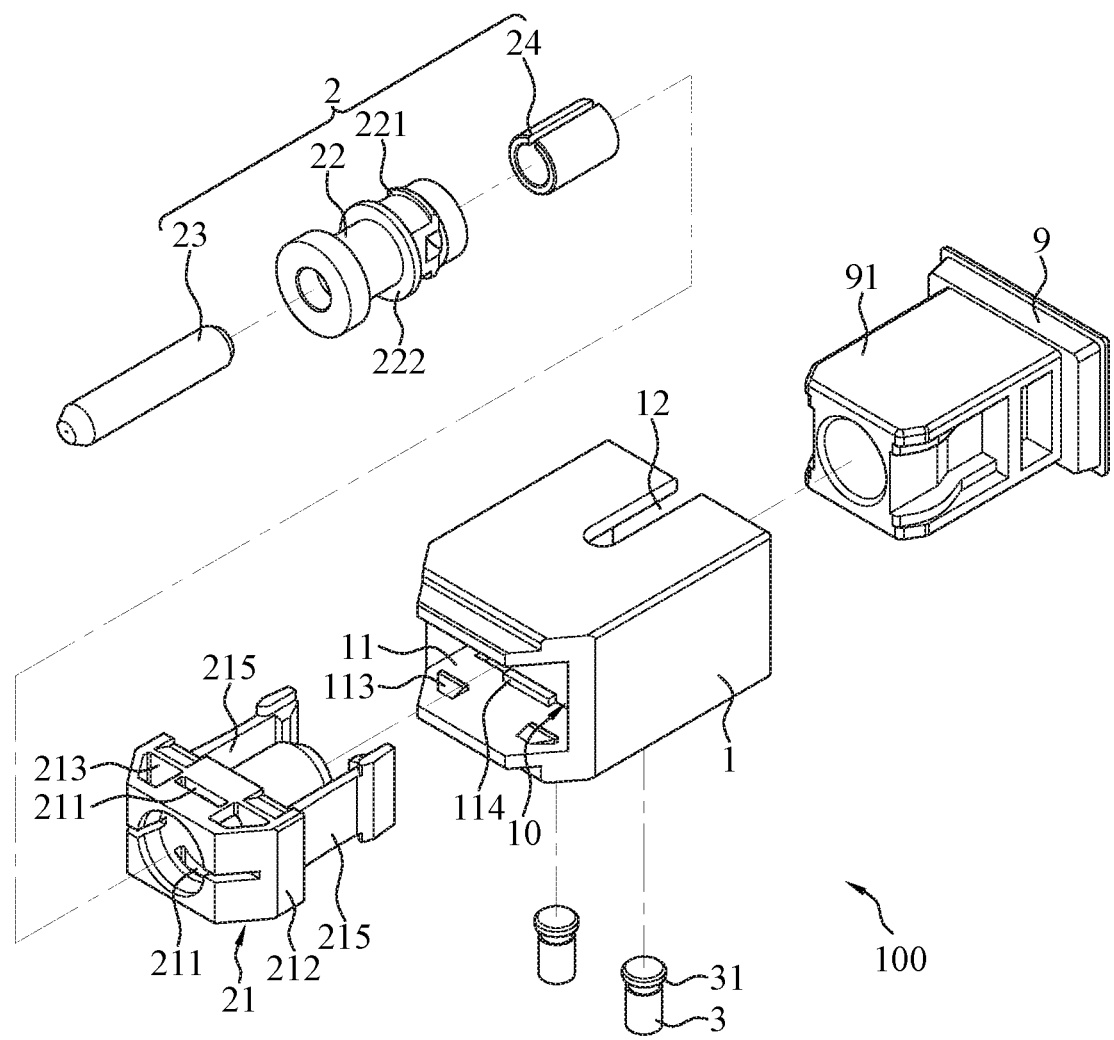
FIG. 2 illustrates an exploded view of the fiber optical connector of the exemplary embodiment.

Please refer to FIGS. 1 and 2. FIG. 1 illustrates a perspective view of a fiber optical connector 100 according to an exemplary embodiment of the instant disclosure, where the rear view of the fiber optical connector 100 is illustrated. FIG. 2 illustrates an exploded view of the fiber optical connector 100 of the exemplary embodiment, where the front view of the fiber optical connector 100 is illustrated. As shown in FIGS. 1 and 2, the fiber optical connector 100 of the exemplary embodiment is illustrated. The fiber optical connector 100 is applicable to be coupled to an MPO (multi-fibre push on) connector. In this embodiment, the fiber optical connector 100 comprises a connector housing 1 and an optical-fiber component 2.

Figure 5:
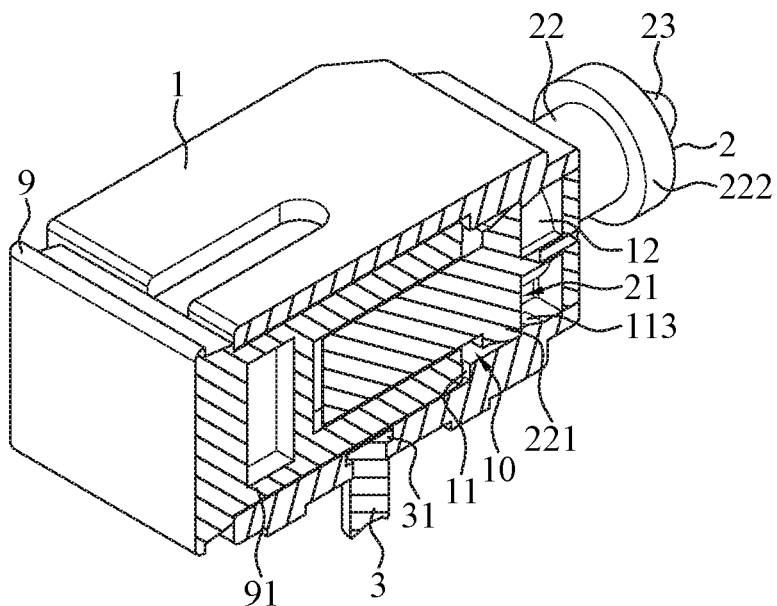
FIG. 5 illustrates a perspective sectional view (1) of the fiber optical connector of the exemplary embodiment.
Figure 6:
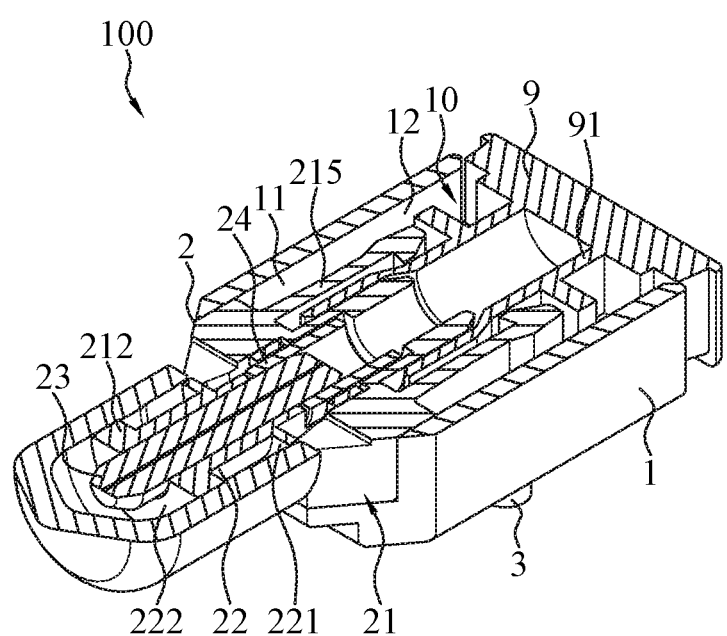
FIG. 6 illustrates a perspective sectional view (2) of the fiber optical connector of the exemplary embodiment.

Please refer to FIGS. 1, 2, 5, and 6. FIG. 5 illustrates a perspective sectional view (1) of the fiber optical connector 100 of the exemplary embodiment, and FIG. 6 illustrates a perspective sectional view (2) of the fiber optical connector 100 of the exemplary embodiment. In this embodiment, the connector housing 1 comprises a receiving space 10. Two ends of the connector housing 1 respectively form a first connector opening 11 and a second connector opening 12. The first connector opening 11 and the second connector opening 12 communicate with the receiving space 10.

Please refer to FIGS. 1, 2, and 5. In this embodiment, a plurality of pins 3 is assembled on a side surface of the connector housing 1.

Please refer to FIGS. 1, 2, 5, and 6. In this embodiment, the optical-fiber component 2 is inserted into the receiving space 10 from the first connector opening 11.

Please refer to FIGS. 1, 2, 5, and 6. More specifically, in this embodiment, after the connector housing 1 is formed in the mold by insert molding, the pins 3 are assembled on the bottom portion of the connector housing 1. In this embodiment, the pins 3 are made of zinc alloy. The pins 3 extend outwardly from the bottom portion of the connector housing 1 with an extended length of 2.8 mm. Moreover, each of the pins 3 comprises an outer annular portion 31 fixed with the connector housing 1. Accordingly, the fixation of the pins 3 on the connector housing 1 can be improved, and the pins 3 are not detached from the connector housing 1 easily.

Please refer to FIGS. 1, 2, 5, and 6. More specifically, in this embodiment, the connector housing 1 is a one-piece member, so that the structural strength of the connector housing 1 can be improved. The one-piece configuration of the connector housing 1 allows the appearance of the connector housing 1 to be smoother and simpler and neater.

Please refer to FIGS. 1, 2, 5, and 6. More specifically, in this embodiment, the pins 3 at the bottom portion of the connector housing 1 are inserted into holes of a circuit board. Moreover, the pins 3 are respectively welded in the holes, so that the fiber optical connector 100 can be densely and fixedly positioned on the circuit board. Hence, the fiber optical connector 100 can be properly positioned. Accordingly, the insertion core 23 can have a more precise alignment angle, so that the fiber optical connector 100 can provide a stable signal transmission.

Please refer to FIGS. 1, 2, 5, and 6. More specifically, in this embodiment, a plurality of positioning blocks 13 is protruding from the side surface of the connector housing 1, and the positioning blocks 13 are at two sides of the pins 3. The positioning blocks 13 are abutted on the circuit board.

Figure 3:
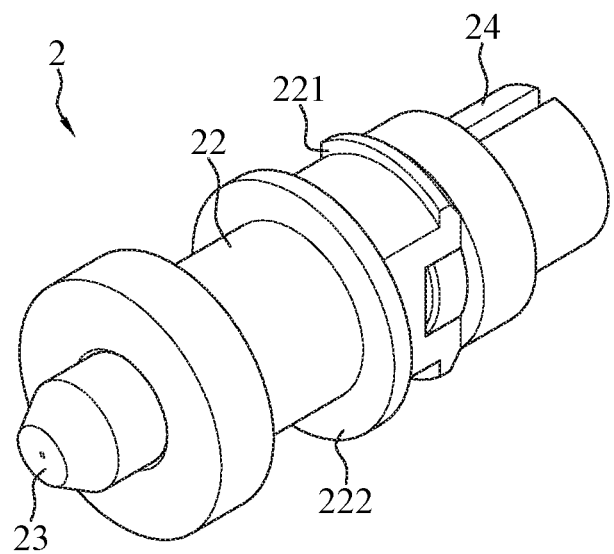
FIG. 3 illustrates a perspective view showing the optical-fiber component devoid of the fixation socket member.
Figure 4:
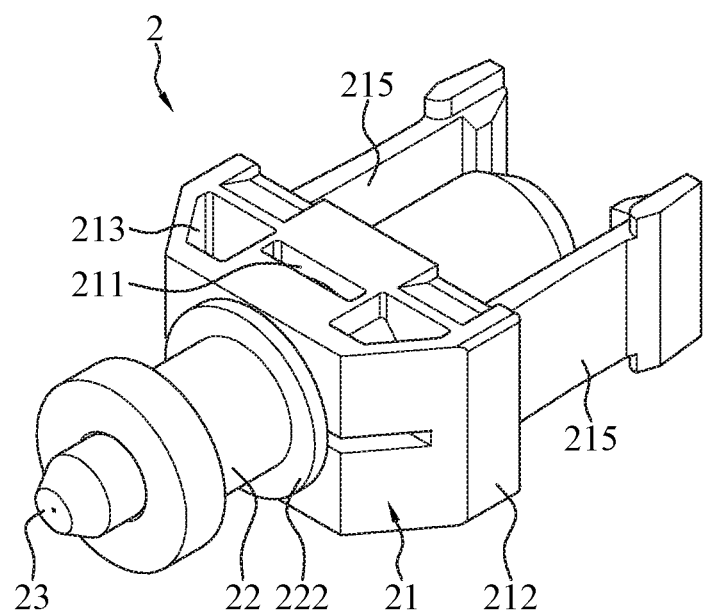
FIG. 4 illustrates a perspective view showing the optical-fiber component.

Please refer to FIGS. 2 to 6. FIG. 3 illustrates a perspective view showing the optical-fiber component 2 devoid of the fixation socket member 21. FIG. 4 illustrates a perspective view showing the optical-fiber component 2. More specifically, in this embodiment, the optical-fiber component 2 comprises a fixation socket member 21, a connection sleeve 22, an insertion core 23, and a sleeve piece 24. The fixation socket member 21 is assembled in the receiving space 10. The connection sleeve 22 is buckled with one end of the fixation socket member 21. The insertion core 23 is in the connection sleeve 22. The sleeve piece 24 holds one end of the insertion core 23 and is fixed in the fixation socket member 21.

Please refer to FIGS. 2 to 6. More specifically, in this embodiment, the fixation socket member 21 is a tubular member. Upper and lower walls of the inner side of the fixation socket member 21 respectively comprise a plurality of engaging grooves 211. A plurality of annular protruding portions 221 is protruding from an outer peripheral surface of one of two ends of the connection sleeve 22, and the annular protruding portions 221 are engaged with the engaging grooves 211, respectively.

Please refer to FIGS. 2 to 6. More specifically, in this embodiment, the connection sleeve 22 is a tubular member made of metal, and the insertion core 23 is fixed in the connection sleeve 22 by riveting.

Please refer to FIGS. 2 to 6. More specifically, in this embodiment, upper and lower walls of the inner side of the connector housing 1 respectively comprise a plurality of protruding blocks 113 and a plurality of baffling blocks 114, and the protruding blocks 113 and the baffling blocks 114 are adjacent to the first connector opening 11. The fixation socket member 21 comprises a stopping member 212. Upper and lower walls of the stopping member 212 comprise a plurality of buckling grooves 213 for buckling with the protruding blocks 113, and the baffling blocks 114 are abutted against an inner wall of the stopping member 212.

Please refer to FIGS. 2 to 6. More specifically, in this embodiment, the other end of the connection sleeve 22 is exposed out of the fixation socket member 21. A stopping flange 222 is protruding from an outer peripheral surface of the other end of the connection sleeve 22, and the stopping flange 222 is abutted against an outer surface of the stopping member 212. Moreover, an outer diameter of each of the annular protruding portions 221 is less than an outer diameter of the stopping flange 222.

Please refer to FIGS. 2 to 6. More specifically, two side arms 215 extend from two sides of a side wall of the stopping member 212, and the side arms 215 outwardly extend into the receiving space 10.

Please refer to FIGS. 1 and 2. In this embodiment, the fiber optical connector 100 further comprises a dustproof cap 9. A casing 91 extends from a side surface of the dustproof cap 9, and the side arms 215 of the fixation socket member 21 are respectively engaged with two sides of the casing 91. When the second connector opening 12 of the connector housing 1 is not connected to an mating MPO connector, the second connector opening 12 may be assembled with the dustproof cap 9, and the dustproof cap 9 covers the second connector opening 12.

According to one or some embodiments of the instant disclosure, following advantages can be provided.

The one-piece connector housing has improved structural strength and aesthetic appearance, and the connector housing can be manufactured with increased production efficiency and reduced costs.

The assembling between the connector housing and the optical-fiber component is achieved by mechanical engaging structures. Hence, the product can be manufactured automatically, and the performances of the product during the manufacturing process can be monitored by different signals.

The connector housing is assembled with plural pins. The pins have high structural strengths. In one embodiment, the pins are made of zinc alloy, and the assembling between the pins and the circuit board allows the connector to be fixedly positioned with the circuit board, thereby ensuring the insertion core to have a more precise alignment angle. Hence, the fiber optical connector can be coupled with the electronic devices in a simple and convenient manner, and the fiber optical connector can provide a stable signal transmission.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A fiber optical connector, comprising a connector housing and an optical-fiber component, wherein the connector housing comprises a receiving space, two ends of the connector housing respectively form a first connector opening and a second connector opening, the first connector opening and the second connector opening communicate with the receiving space, a plurality of pins is assembled on a side surface of the connector housing, and the optical-fiber component is inserted into the receiving space from the first connector opening, wherein a plurality of positioning blocks is protruding from the side surface of the connector housing, and the positioning blocks are at two sides of the pins.

2. The fiber optical connector according to claim 1, wherein the optical-fiber component comprises a fixation socket member, a connection sleeve, an insertion core, and a sleeve piece, the fixation socket member is assembled in the receiving space, the connection sleeve is buckled with one end of the fixation socket member, the insertion core is in the connection sleeve, the sleeve piece holds one end of the insertion core and is fixed in the fixation socket member.

3. The fiber optical connector according to claim 2, wherein an inner side of the fixation socket member comprises a plurality of engaging grooves, a plurality of annular protruding portions is protruding from an outer peripheral surface of one of two ends of the connection sleeve, and the annular protruding portions are engaged with the engaging grooves, respectively.

4. The fiber optical connector according to claim 3, wherein an inner surface of the connector housing comprises a plurality of protruding blocks and a plurality of baffling blocks, the protruding blocks and the baffling blocks are adjacent to the first connector opening; the fixation socket member comprises a stopping member, the stopping member comprises a plurality of buckling grooves for buckling with the protruding blocks, and the baffling blocks are abutted against an inner wall of the stopping member.

5. The fiber optical connector according to claim 4, wherein the other end of the connection sleeve is exposed out of the fixation socket member, a stopping flange is protruding from an outer peripheral surface of the other end of the connection sleeve, and the stopping flange is abutted against an outer surface of the stopping member.

6. The fiber optical connector according to claim 5, wherein an outer diameter of each of the annular protruding portions is less than an outer diameter of the stopping flange.

7. The fiber optical connector according to claim 4, wherein two side arms extend from two sides of a side wall of the stopping member, and the side arms outwardly extend into the receiving space.

8. The fiber optical connector according to claim 7, further comprising a dustproof cap covering the second connector opening, wherein a casing extends from a side surface of the dustproof cap, and the side arms are respectively engaged with two sides of the casing.

9. A fiber optical connector, comprising a connector housing and an optical-fiber component, wherein the connector housing comprises a receiving space, two ends of the connector housing respectively form a first connector opening and a second connector opening, the first connector opening and the second connector opening communicate with the receiving space, a plurality of pins is assembled on a side surface of the connector housing, and the optical-fiber component is inserted into the receiving space from the first connector opening, wherein each of the pins comprises an outer annular portion fixed with the connector housing.

10. The fiber optical connector according to claim 9, wherein a plurality of positioning blocks is protruding from the side surface of the connector housing, and the positioning blocks are at two sides of the pins.

11. The fiber optical connector according to claim 10, wherein the optical-fiber component comprises a fixation socket member, a connection sleeve, an insertion core, and a sleeve piece, the fixation socket member is assembled in the receiving space, the connection sleeve is buckled with one end of the fixation socket member, the insertion core is in the connection sleeve, the sleeve piece holds one end of the insertion core and is fixed in the fixation socket member.

12. The fiber optical connector according to claim 11, wherein an inner side of the fixation socket member comprises a plurality of engaging grooves, a plurality of annular protruding portions is protruding from an outer peripheral surface of one of two ends of the connection sleeve, and the annular protruding portions are engaged with the engaging grooves, respectively.

13. The fiber optical connector according to claim 12, wherein an inner surface of the connector housing comprises a plurality of protruding blocks and a plurality of baffling blocks, the protruding blocks and the baffling blocks are adjacent to the first connector opening; the fixation socket member comprises a stopping member, the stopping member comprises a plurality of buckling grooves for buckling with the protruding blocks, and the baffling blocks are abutted against an inner wall of the stopping member.

14. The fiber optical connector according to claim 13, wherein the other end of the connection sleeve is exposed out of the fixation socket member, a stopping flange is protruding from an outer peripheral surface of the other end of the connection sleeve, and the stopping flange is abutted against an outer surface of the stopping member.

15. The fiber optical connector according to claim 14, wherein an outer diameter of each of the annular protruding portions is less than an outer diameter of the stopping flange.

16. The fiber optical connector according to claim 13, wherein two side arms extend from two sides of a side wall of the stopping member, and the side arms outwardly extend into the receiving space.

17. The fiber optical connector according to claim 16, further comprising a dustproof cap covering the second connector opening, wherein a casing extends from a side surface of the dustproof cap, and the side arms are respectively engaged with two sides of the casing.

\* \* \* \* \*